United States Patent
Azami

(10) Patent No.: US 7,428,065 B2
(45) Date of Patent: Sep. 23, 2008

(54) PRINTER AND INFORMATION PROCESSING APPARATUS

(75) Inventor: Osamu Azami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1119 days.

(21) Appl. No.: 10/664,577

(22) Filed: Sep. 17, 2003

(65) Prior Publication Data

US 2004/0114156 A1 Jun. 17, 2004

(30) Foreign Application Priority Data

Sep. 17, 2002 (JP) .................... P. 2002-270235

(51) Int. Cl.
*G06K 1/00* (2006.01)
(52) U.S. Cl. .................... 358/1.1; 709/245; 358/448
(58) Field of Classification Search ........... 358/1.1–1.9, 358/1.11–1.18, 448; 709/245; 368/9
See application file for complete search history.

(56) References Cited

U.S. PATENT DOCUMENTS 7,313,633 B2 * 12/2007 Beverly ................ 709/245
2003/0090742 A1 * 5/2003 Fukuda et al. .......... 358/448

FOREIGN PATENT DOCUMENTS

| JP | 5-341065 | 12/1993 |
| JP | P2000-289296 A | 10/2000 |
| JP | 2001-80167 | 3/2001 |
| JP | P2001-270197 A | 10/2001 |

OTHER PUBLICATIONS

Patent Abstracts of Japan—Publication No. 2000-289296 dated Oct. 17, 2000 (2 pages).
Patent Abstracts of Japan—Publication No. 2001-270197 dated on Oct. 2, 2001 (2 pages).
Japanese Office Action for Japanese Appl. No. 2002-270235 mailed on Aug. 30, 2005, 2 pages.
Patent Abstracts of Japan, Publication No. 05-341065, Publication Date Dec. 24, 1993, 2 pages.
Patent Abstracts of Japan, Publication No. 2001-080167, Publication Date Mar. 27, 2001, 2 pages.
Patent Abstracts of Japan Mechanical English Translation of Japanese Patent Application No. 05-341065, 9 pages.
Patent Abstracts of Japan Mechanical English Translation of Japanese Patent Application No. 2001-080167, 11 pages.

* cited by examiner

*Primary Examiner*—King Poon
*Assistant Examiner*—Lennin R Rodriguez
(74) *Attorney, Agent, or Firm*—Osha Liang LLP

(57) ABSTRACT

An information processing apparatus is configured as an apparatus for accessing an external date and time management apparatus, such as an SNTP server, to adjust the date and time of an internal clock and as an apparatus for calculating the next date and time adjustment execution date and time so that an error of the internal clock falls within the allowance time specified by the user whenever the date and time are adjusted.

8 Claims, 7 Drawing Sheets

FIG. 2

Engine Status Sheet

Total Counts
    Total Pages                      4,253 pages
    Total Pages (A4)         17,571 pages
    Total Planes                  58,449 planes
    Color Pages                  2,826 pages
    Jam Counts                   32

ET Cartridge
    C Toner                         8,435 (100msec)
    M Toner                        2,090 (100msec)
    Y Toner                         3,280 (100msec)
    K Toner                         2,155 (100msec)

Xero CRU                       83,958 cycle
Fuser                            17,616 pages
2nd BTR                        17,616 pages
IBT Cleaner                 24,734 pages
IBT Belt                        72,682 cycle Development Unit
    C Development           16,716 planes
    M Development           16,756 planes
    Y Development           16,854 planes
    K Development           22,986 planes 2nd BTR Offset
    Plain Paper 1                3
    Transparency                 3
    Cover                          3
    Coated Paper 1             3
    Card                           3
    Envelope                     3

Engine Version
    MCU                            310457
    Duplex                         010002
    LCC                             000018

Error Log

| Panel Message | | Code | Page | Date | Time |
|---|---|---|---|---|---|
| Service Req | E516 | 6516 | 4,185 | 2002/04/26 | 17:34 |
| Jam B | | 4008 | 3,690 | 2002/09/12 | 02:58 |
| Jam E D C | | 4009 | 3,376 | 2002/07/22 | 16:56 |
| Jam B | | 4008 | 3,246 | 2002/07/08 | 15:52 |
| Jam B | | 4008 | 2,922 | 2002/07/02 | 02:07 |
| Jam B | | 4008 | 2,824 | 2002/06/14 | 04:19 |
| Jam C | | 4009 | 2,823 | 2002/06/14 | 03:28 |
| Jam E D C | | 4009 | 2,111 | 2002/06/05 | 01:21 |
| Jam E D C | | 4009 | 2,029 | 2002/06/03 | 23:34 |
| Jam E D C | | 4009 | 187 | 2002/05/13 | 15:01 |
| Jam C | | 4009 | 3 | 2002/05/11 | 19:24 |

FIG. 3

Job Information: AL-C**** [hcpr121.hro.epson.co.jp]

Job List: All Jobes [Refresh]

| No | User Name | Job Name | Job Type | Print Status | Job Control |
|---|---|---|---|---|---|
| 1466 | yokoyama | 1 | Normal | printSuccess Completed | |
| 1467 | | | Normal | printSuccess Completed | |
| 1468 | | | Normal | printSuccess Completed | |
| 1469 | yokoyama | 2 | Normal | printSuccess Completed | |
| 1470 | yokoyama | 3 | Normal | printSuccess Completed | |
| 1471 | yokoyama | 4 | Normal | printSuccess Completed | |

Job Properties

| Item | Contents |
|---|---|
| No | 1471 |
| User Name | yokoyama |
| Job Name | 4 |
| Job Type | Normal |
| Document Name | PageRoadmap_2002_04.xls |
| Job Date | 2002/6/24 15:37:15 |
| JobID | dfA001 NPPLPR |

[↑] Return to top

Status

| Item | Contents |
|---|---|

FIG. 4A

《DATE AND TIME ADJUSTMENT CONDITION FILE》
MODE SPECIFICATION INFORMATION
(DATE AND TIME ADJUSTMENT MODE = NON-ADJUSTMENT MODE)

FIG. 4B

《DATE AND TIME ADJUSTMENT CONDITION FILE》
MODE SPECIFICATION INFORMATION
(DATE AND TIME ADJUSTMENT MODE = SNTP MODE)
PRIMARY DNS SERVER ADDRESS
SECONDARY DNS SERVER ADDRESS
SERVER NAME/IP ADDRESS OF SNTP SERVER
ALLOWANCE TIME
ADJUSTMENT CYCLE

FIG. 4C

《DATE AND TIME ADJUSTMENT CONDITION FILE》
MODE SPECIFICATION INFORMATION
(DATE AND TIME ADJUSTMENT MODE = LOCAL MODE)
ALLOWANCE TIME
ADJUSTMENT CYCLE

FIG. 7

| | | OPERATION OF INFORMATION PROCESSING APPARATUS WHEN KEEPING TRACK OF REAL DATE AND TIME ENDED IN FAILURE |
|---|---|---|
| DATE AND TIME MANAGEMENT APPARATUS | SNTP SERVER | • DISPLAY ERROR MESSAGE<br>• WHEN PROCESSING ENDED IN FAILURE AT S102, EXECUTE PROCESSING STARTING AT S102 IN PREDETERMINED TIME<br>• WHEN PROCESSING ENDED IN FAILURE AT S106, SET DATE AND TIME IN PREDETERMINED TIME AS ADJUSTMENT EXECUTION DATE AND TIME AND GO TO S105 |
| | LOCAL HOST | • DISPLAY ERROR MESSAGE<br>• UPON RECEPTION OF DATE AND TIME ADJUSTMENT REQUEST, START EXECUTION OF DATE AND TIME ADJUSTMENT PROCESSING |

PRINTER AND INFORMATION PROCESSING APPARATUS

The present application is based on Japanese Patent Application No. 2002-270235, which is incorporated herein by reference.

BACKGROUND OF THE INVENTION

1. Field of the Invention

This invention relates to a printer and information processing apparatus.

2. Description of the Related Art

Some information processing apparatus include a free-running counter used as current date and time management means, which will be hereinafter referred to as internal clock. Some of such information processing apparatus can acquire the precise date and time from an external apparatus and adjust the internal clock to the acquired date and time.

Specifically, there are a television and a printer for adjusting the date and time of an internal clock based on the time signal information contained in broadcast waves (for example, refer to patent document 1), an apparatus for accessing an SNTP server and adjusting the time and date of a system clock (a computer, etc., installing a utility program for accessing an SNTP server and adjusting the time and date of a system clock), and the like. A printer having an RTC (real time clock) whose time can be set from a host computer is also available (for example,. refer to patent document 2).

[Patent Document 1]
Unexamined Japanese Patent Publication No. 2000-289296 (p. 3-6, FIG. 1)

[Patent Document 2]
Unexamined Japanese Patent Publication No. 2001-270197 (p. 7-8, FIG. 3)

The already existing information processing apparatus that can acquire the precise date and time from an external apparatus and adjust the internal clock to the acquired date and time as described above is an apparatus for adjusting the date and time when the user gives a command or in the cycle previously specified by the user.

Even information processing apparatus of the same model differ in precision of internal clock (how much the clock loses or gains). Thus, if the date and time of the clock are adjusted with a frequency more than necessary, the essential processing of the information apparatus may be adversely affected (completion of the essential processing may be a little delayed). If the information processing apparatus inquires of an SNTP server about the date and time, the SNTP server and the network resources are also used wastefully.

Thus, in the existing information processing apparatus, the following intricate work procedure for specifying (setting) the time interval is performed: First, standard time interval is set as the time interval for adjusting the date and time and after how much the internal clock loses or gains is observed, if the loss or gain is beyond the allowable range, the time interval for adjusting the date and time is again set to a shorter time interval.

SUMMARY OF THE INVENTION

It is therefore an object of the invention to provide a printer and an information processing apparatus that can be operated with the date and time adjusted at proper intervals simply by performing easy work.

To the end, according to the invention, there is provided a printer including time count means of means requiring setting of reference date and time and means for measuring the elapsed time since the date and time at which the reference date and time were set and outputting the date and time resulting from adding the measured elapsed time to the reference date and time as the current date and time; allowable time storage means for storing allowable time set by the user; rewritable nonvolatile information storage means; event relevant information preparation means for preparing event relevant information containing the current date and time obtained from the time count means each time occurrence of one event is detected, and storing the event relevant information in the information storage means; and date and time adjustment means for repeating date and time setting processing of acquiring the current date and time from each of an external apparatus having a function of outputting the current date and time and the time count means and setting the current date and time obtained from the external apparatus in the time count means as the reference date and time, whenever the date and time adjustment means executes the date and time setting processing, the date and time adjustment means for determining the next execution date and time of the date and time setting processing so that the possible difference between the expected current date and time which will be obtained from the external apparatus and the expected current date and time which will be obtained from the time count means at the next date and time setting processing execution time becomes equal to or less than the allowable time based on the current date and time obtained from the external apparatus, the current date and time obtained from the time count means, the elapsed time since the previous execution date and time of the date and time setting processing, and the allowable time stored in the information storage means.

That is, the printer of the invention has the configuration for automatically determining the next date and time adjustment execution date and time so that the difference (the absolute value of the difference) between the current date and time managed by the time count means and the current date and time managed in the external apparatus becomes equal to or less than the allowable time as the user simply sets the allowable time, and also has the configuration for using the current date and time output by the time count means as a time stamp (the current date and time in the event relevant information) and changing the current date and time used as the time stamp so as to represent the precise date and time at all times. Therefore, the printer is a printer that can be operated with the date and time adjusted at proper intervals as the user simply performs easy work; it functions as a printer for making it possible to precisely keep track of the event occurrence date and time.

To configure the printer of the invention, the use method of the event relevant information in the information storage means is not limited. For example, the printer can be configured so as to have a function of preparing printed matter of several pieces of event relevant information stored in the information storage means.

According to the invention, there is provided an information processing apparatus including time count means of means requiring setting of reference date and time and means for measuring the elapsed time since the date and time at which the reference date and time were set and outputting the date and time resulting from adding the measured elapsed time to the reference date and time as the current date and time; allowable time storage means for storing allowable time set by the user; and date and time adjustment means for repeating date and time setting processing of acquiring the current date and time from each of an external apparatus having a function of outputting the current date and time and the time count means and setting the current date and time obtained from the external apparatus in the time count means as the reference date and time, when the date and time adjustment means executes the date and time setting processing at the second time, the date and time adjustment means for determining the execution cycle of the date and time setting processing so that the possible difference between the expected current date and time which will be obtained from the external apparatus and the expected current date and time which will be obtained from the time count means at the next or later date and time setting processing execution time becomes equal to or less than the allowable time based on the current date and time obtained from the external apparatus, the current date and time obtained from the time count means, the elapsed time since the previous execution date and time of the date and time setting processing, and the allowable time stored in the information storage means.

That is, the information processing apparatus has the configuration for automatically determining the date and time adjustment execution cycle so that the difference (the absolute value of the difference) between the current date and time managed by the time count means and the current date and time managed in the external apparatus becomes equal to or less than the allowable time as the user simply sets the allowable time. Therefore, the information processing apparatus functions as an information processing apparatus that can be operated with the date and time adjusted at proper intervals as the user simply performs easy work.

According to another aspect of the invention, there is provided an information processing apparatus including time count means of means requiring setting of reference date and time and means for measuring the elapsed time since the date and time at which the reference date and time were set and outputting the date and time resulting from adding the measured elapsed time to the reference date and time as the current date and time; allowable time storage means for storing allowable time set by the user; and date and time adjustment means for repeating date and time setting processing of acquiring the current date and time from each of an external apparatus having a function of outputting the current date and time and the time count means and setting the current date and time obtained from the external apparatus in the time count means as the reference date and time, whenever the date and time adjustment means executes the date and time setting processing, the date and time adjustment means for determining the next execution date and time of the date and time setting processing so that the possible difference between the expected current date and time which will be obtained from the external apparatus and the expected current date and time which will be obtained from the time count means at the next date and time setting processing execution time becomes equal to or less than the allowable time based on the current date and time obtained from the external apparatus, the current date and time obtained from the time count means, the elapsed time since the previous execution date and time of the date and time setting processing, and the allowable time stored in the information storage means.

That is, the information processing apparatus has the configuration for automatically determining the next date and time adjustment execution date and time so that the difference (the absolute value of the difference) between the current date and time managed by the time count means and the current date and time managed in the external apparatus becomes equal to or less than the allowable time as the user simply sets the allowable time. Therefore, the information processing apparatus also functions as an information processing apparatus that can be operated with the date and time adjusted at proper intervals as the user simply performs easy work.

To implement the information processing apparatus, whenever the date and time adjustment means executes the date and time setting processing, the date and time adjustment means may determine the next execution date and time of the date and time setting processing so that the possible difference between the expected current date and time which will be obtained from the external apparatus and the expected current date and time which will be obtained from the time count means at the next date and time setting processing execution time matches the allowable time based on the current date and time obtained from the external apparatus, the current date and time obtained from the time count means, the elapsed time since the previous execution date and time of the date and time setting processing, and the allowable time stored in the information storage means.

The information processing apparatus configured using such date and time adjustment means functions as an apparatus wherein the date and time are adjusted with a low frequency. Thus, if the information processing apparatus is implemented with the external apparatus as the SNTP server, there can be provided an information processing apparatus wherein the date and time are adjusted without wastefully using the SNTP server or the network resources.

The information processing apparatus of the invention may further include rewritable nonvolatile information storage means; and event relevant information preparation means for preparing event relevant information containing the current date and time obtained from the time count means each time occurrence of a predetermined event is detected, and storing the event relevant information in the information storage means, wherein when executing the date and time setting processing, the date and time adjustment means may also adjust each current date and time indicating the date and time after the previous execution date and time of the date and time setting processing in the current date and time stored in the information storage means as an element of the event relevant information to the current date and time in the external apparatus by performing calculation processing using the current date and time obtained from the external apparatus, the current date and time obtained from the time count means, the previous execution date and time of the date and time setting processing, and the elapsed time since the previous execution date and time.

In other words, to implement the information processing apparatus of the invention as an apparatus for using the current date and time output by the time count means as a time stamp, it is desirable that the date and time adjustment means should be means having a function of changing the time stamp so as to represent the precise date and time.

BRIEF DESCRIPTION OF THE DRAWINGS

In the accompanying drawings:

FIG. 2 is a schematic representation of a status sheet printed by the information processing apparatus;

FIG. 3 is a schematic representation of a Web page displayed by a host based on information output by the information processing apparatus;

FIG. 4 is a schematic representation of a date and time adjustment condition file retained by the information processing apparatus;

FIG. 7 is a drawing to describe the operation of the information processing apparatus when a communication error occurs during date and time adjustment processing.

DETAILED DESCRIPTION OF THE PREFERRED EMBODIMENTS

Referring now to the accompanying drawings, there are shown preferred embodiments of the invention.

An outline of an information processing apparatus according to one embodiment of the invention will be discussed with FIGS. 1 to 3.

Figure 1:
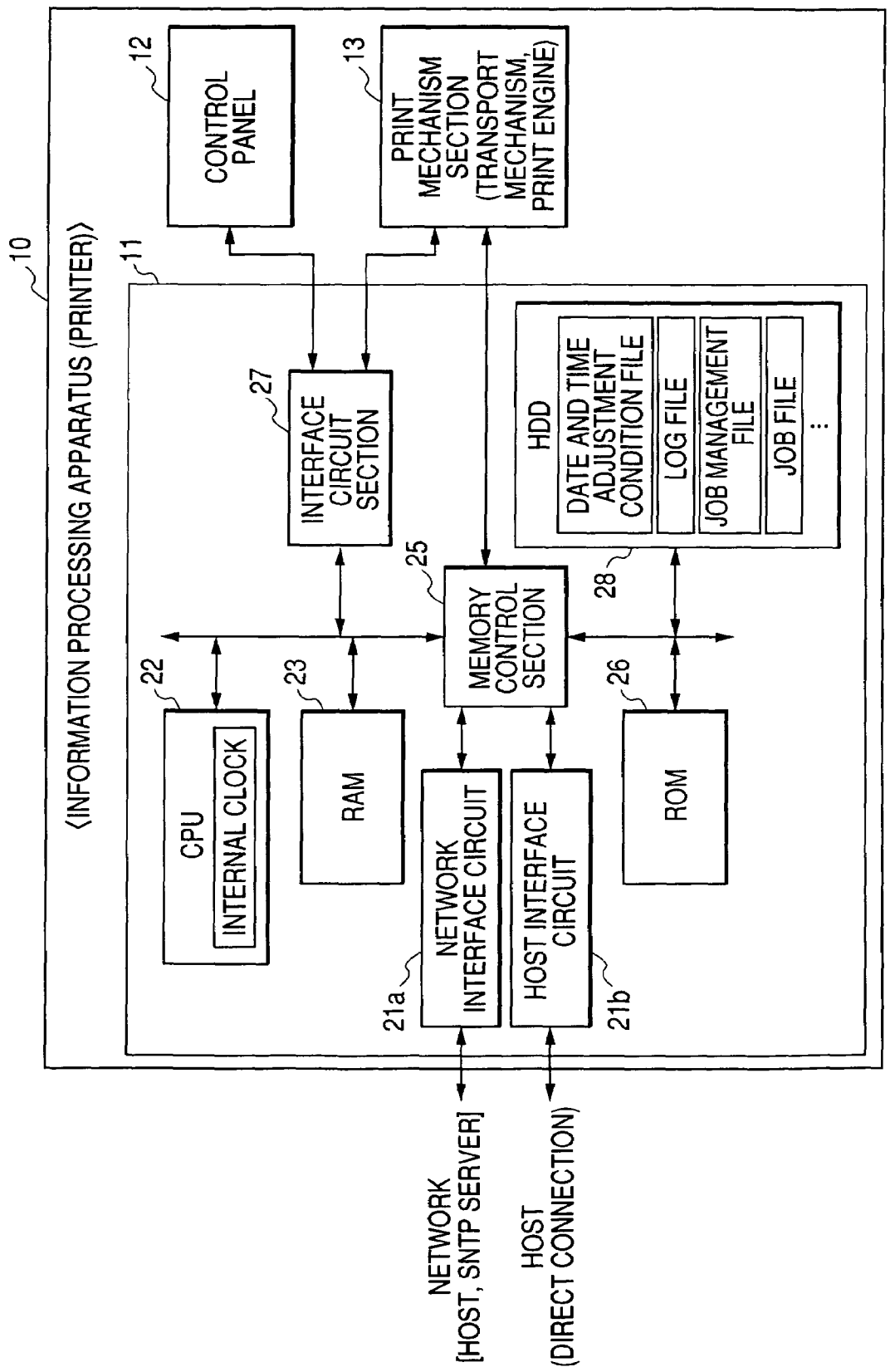
FIG. 1 is a block diagram of the hardware of an information processing apparatus (printer) according to an embodiment of the invention.

As shown in FIG. 1, an information processing apparatus 10 according to one embodiment of the invention is a printer including a control section 11, a control panel 12, and a print mechanism section 13 as main components. The information processing apparatus 10 is a printer that can be used from a host on a network or from a host directly connected to the printer (printer that can be used as a network printer or a local printer). The host refers to a computer installing a control program of a program for using the information processing apparatus 10 (printer driver).

The print mechanism section 13 provided in the information processing apparatus 10 is a mechanism for actually printing on paper. It is made up of a paper feeder, a paper transport mechanism, a print engine, etc. The control panel 12 is an interface between the user and the information processing apparatus 10; it is made up of a plurality of buttons for specifying the operation details of the information processing apparatus 10 and several LEDs and a liquid crystal display for displaying the operation state of the information processing apparatus 10, etc.

The control section 11 is a unit that can execute processing of causing the print mechanism section 13 to print as print job data received from the host, processing of putting the print job data retention of which is instructed into a file for retention (internal storage), processing of causing the print mechanism section 13 to print as the retained print job data, processing of printing/transmitting internally stored information, date and time adjustment processing (described later in detail), and the like.

The control section 11 is a unit into which a network interface circuit 21a, a host interface circuit 21b, a CPU 22, RAM 23, a memory control section 25, ROM 26, an interface circuit section 27, an HDD 28, and the like are combined.

The network interface circuit 21a included in the control section 11 is a circuit for conducting communications (information exchange) with the host on the network and an SNTP server. The host interface circuit 21b is an interface for conducting communications with the directly connected host. The ROM 26 is nonvolatile memory storing programs and font data. The CPU 22 is a control circuit for controlling the members in the control section 11 in accordance with the program stored in the ROM 26. The CPU 22 has an internal clock (corresponding to time count means) of a software counter based on a timer interrupt for managing the current date and time. The above-mentioned date and time adjustment processing is processing for adjusting the date and time of the internal clock (described later in detail).

The RAM 23 is memory used to temporarily store print job data received by the network interface circuit 21a/host interface circuit 21b, data generated by the CPU 22 based on the print job data, and the like. The memory control section 25 is a circuit for performing processing of transferring data from the network interface circuit 21a/host interface circuit 21b to the RAM 23 and processing of transferring data from the RAM 23 to the print engine in the print mechanism section 13 as instructed by the CPU 22. The interface circuit section 27 is a unit (interface circuitry) used by the CPU 22 to exchange information with the control panel 12 and the transport mechanism in the print mechanism section 13. The CPU 22 recognizes the state of each button on the control panel 12 (as to whether or not each button is pressed) through the interface circuit section 27 and controls the LEDs and the liquid crystal display on the control panel 12 through the interface circuit section 27. The CPU 22 also recognizes the state of each mechanism in the print mechanism section 13 and controls the mechanisms through the interface circuit section 27.

The HDD 28 is an auxiliary storage unit used to store a date and time adjustment condition file, a log file, a job management file, a job file, etc.

The date and time adjustment condition file is a file storing various pieces of information required for date and time adjustment processing. The date and time adjustment condition file will be discussed in detail in the description of date and time adjustment processing.

The log file is a file for storing information indicating the description and the date and time of each error which occurred and the like (information concerning the operation record of the information processing apparatus 10). The control section 11 updates the contents of the log file as required. When a predetermined instruction is given (when the user performs predetermined operation on the control panel 12 or a predetermined request is received from the host), the control section 11 performs processing of causing the print mechanism section 13 to print a status sheet as shown in FIG. 2 based on the information in the log file.

The job file is a file created on the HDD 28 by the control section 11 based on the print job data retention of which is instructed. The job management file is a file for storing information to manage the job file stored on the HDD 28 (information consisting of the creation date and time of the job file, the name of the person giving an instruction for retaining the job file, and the like). When the job file is created or deleted, the control section 11 updates the contents of the job management file. The control section 11 is also given a function of outputting (printing/transmitting) the information in the job management file. The function enables the host (Web browser) on the network to display a Web page as shown in FIG. 3.

To sum up, the information processing apparatus 10 (control section 11) is an apparatus using the current date and time output by the internal clock of the CPU 22 rather than a real time clock IC, etc., (hardware that can output the precise current date and time) to execute various types of processing requiring the current date and time. The information processing apparatus 10 (control section 11) is an apparatus for performing novel date and time adjustment processing to adjust the date and time of the internal clock.

On the understanding of the description given above, the configuration and operation of the information processing apparatus 10 according to the embodiment of the invention will be discussed more specifically centering on the portion in which the date and time adjustment processing is involved.

The information processing apparatus 10 is an apparatus operating in any of a non-adjustment mode for performing no date and time adjustment of the internal clock of the control section 11 (CPU 22), an SNTP mode for adjusting the date and time of the internal clock using the SNTP mode, or a local mode for adjusting the date and time of the internal clock using the local host (directly connected host).

Further, to operate the information processing apparatus 10 in the SNTP mode, the user (normally, administrator) must preset the DNS (domain name system) server address, the server name (domain name) or IP address of the SNTP server used for date and time adjustment, and the tolerance time; to operate the information processing apparatus 10 in the local mode, the user must preset the tolerance time. To operate the information processing apparatus 10 in the local mode, the user must also previously install a date and time output program of a program developed for the information processing apparatus 10 (described later in detail) in the host directly connected to the information processing apparatus 10 and must preset the host so that the date and time output program is always executed during the operation of the host. Although the use procedure of the date and time output program by the control section 11 is described later, the date and time output program monitors transmission of a request of a predetermined format from the information processing apparatus 10 (control section 11) and when the request is transmitted, the date and time output program responds to the request with information containing the current time managed by a system clock in the host.

The date and time adjustment condition file is a file storing mode specification information to instruct the control section 11 which mode the information processing apparatus 10 should operate in, and information required for the operation in each mode, as schematically shown in FIGS. 4A to 4C. The adjustment cycle shown in each of the date and time adjustment condition files for instructing the information processing apparatus 10 to operate in the SNTP mode (FIG. 4B) and in the local mode (FIG. 4C) is information set by the control section 11 rather than by the user (described later in detail).

The date and time adjustment condition file is a file whose contents can be set (changed) by the user who operates the host (uses the control program).

Figure 5A:
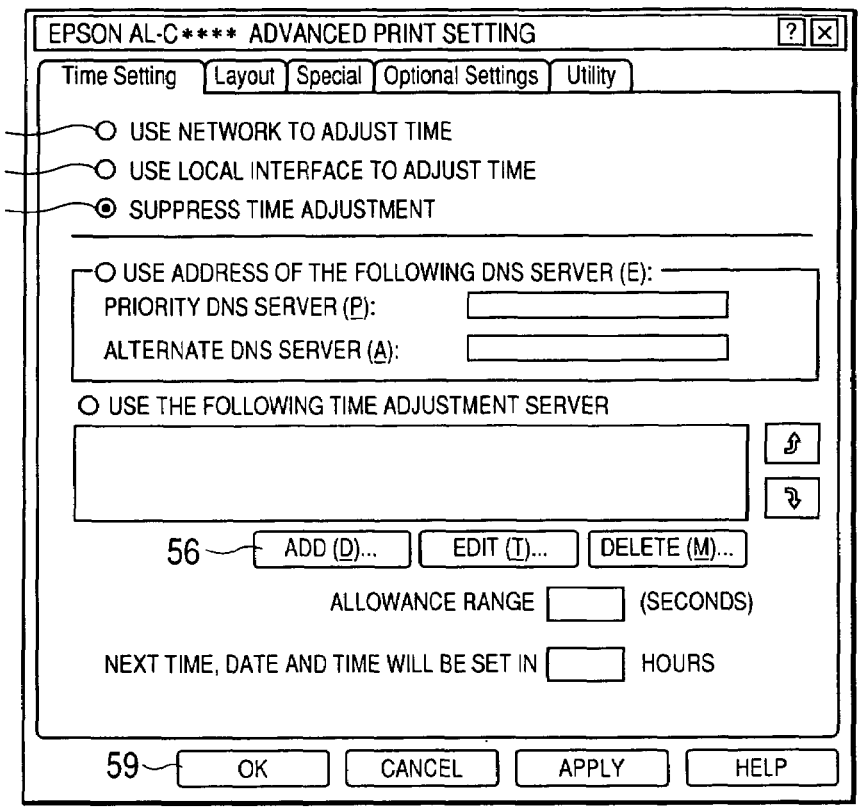
FIG. 5 is a schematic representation of an operation condition setting dialog box displayed by a control program.
Figure 5B:
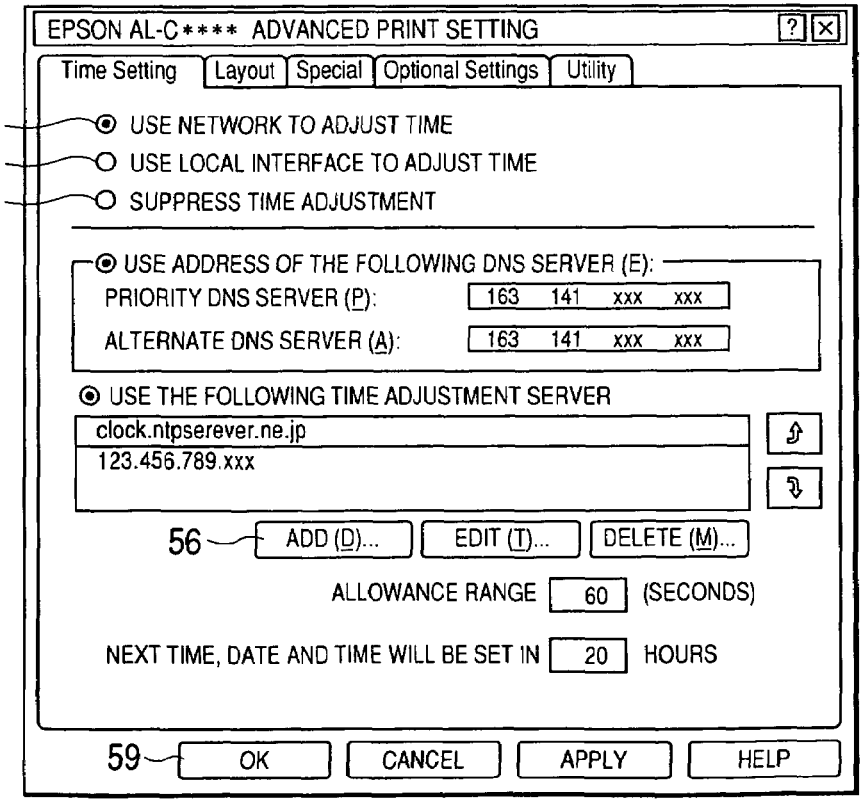

Specifically, when the user performs predetermined operation for the host, the control program acquires various pieces of information (information in an operation status environment file and any other information) from the information processing apparatus 10 and then displays an operation condition setting dialog box as shown in FIGS. 5A or 5B on a display.

The operation condition setting dialog box shown in FIG. 5A is displayed when the information processing apparatus 10 operates in the non-adjustment mode, and the dialog box shown in FIG. 5B is displayed when the information processing apparatus 10 operates in the SNTP mode.

Since the information processing apparatus 10 is manufactured (shipped) in a state in which the date and time adjustment condition file whose contents are shown in FIG. 4A (namely, the date and time adjustment condition file for instructing the control section 11 to operate in the non-adjustment mode) is set, the operation condition setting dialog box shown in FIG. 5A is displayed when operation of the information processing apparatus 10 is started.

To operate the information processing apparatus 10 in the SNTP mode, in the operation condition setting dialog box wherein a radio button 53 is selected, the user selects a radio button 51 and sets the DNS server address, the server name (domain name) or IP address of the SNTP server used for date and time adjustment, and the tolerance time (as an operation sequence starting at pressing an ADD button 56) and then presses an OK button 59 (or APPLY button)

To operate the information processing apparatus 10 in the local mode, the user selects a radio button 52 and sets the tolerance time and then presses the OK button 59 (or APPLY button).

When the user presses the OK button 59 (or APPLY button) in the operation condition setting dialog box, the control program transmits an operation condition setting request containing information representing the setup details of the user to the information processing apparatus 10. Upon reception of the operation condition setting request, the control section 11 in the information processing apparatus 10 changes the contents of the date and time adjustment condition file in the HDD 28 to those responsive to the received operation condition setting request.

If the date and time adjustment condition file whose contents have been changed contains mode specification information specifying the operation in the SNTP mode or the local mode, the control section 11 adds a predefined numeric value (in the embodiment, 20) to the date and time adjustment condition file as the adjustment cycle. Next, the control section 11 enters a mode in which it executes the date and time adjustment processing as background processing.

If the date and time adjustment condition file whose contents have been changed contains mode specification information specifying the operation in the non-adjustment mode, the control section 11 enters a mode in which it does not execute the date and time adjustment processing as background processing. When the power is turned on, first the control section 11 determines whether or not the mode specification information in the date and time adjustment condition file specifies the operation in the non-adjustment mode. If the mode specification information in the date and time adjustment condition file does not specify the operation in the non-adjustment mode, the control section 11 enters the mode in which it executes the date and time adjustment processing as background processing; if the mode specification information in the date and time adjustment condition file specifies the operation in the non-adjustment mode, the control section 11 enters the mode in which it does not execute the date and time adjustment processing as background processing.

Figure 6:
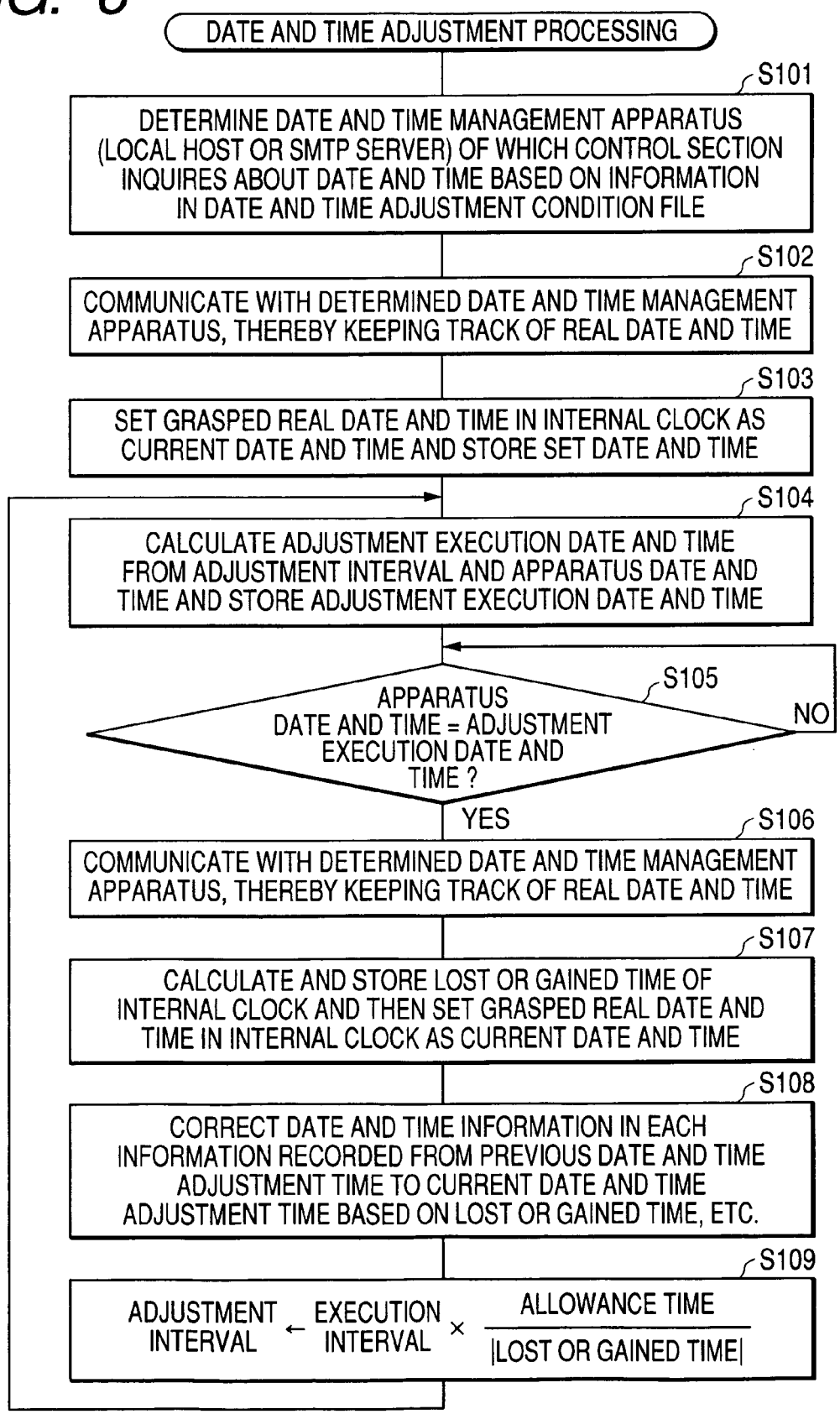
FIG. 6 is a flowchart of date and time adjustment processing executed by the information processing apparatus.

The date and time adjustment processing executed by the control section 11 will be discussed in detail with a flowchart of FIG. 6. This flowchart shows only the normal operation procedure of the control section 11 wherein a communication error does not occur. The operation of the control section 11 when a communication error occurs will be discussed after the description of the normal operation procedure of the control section 11 using the flowchart.

As shown in the figure, the control section 11 starting the date and time adjustment processing first determines the apparatus of which the control section 11 inquires about the date and time, which will be hereinafter referred to as date and time management apparatus, based on the information in the date and time adjustment condition file (step S101). That is, at step S101, if the date and time adjustment condition file contains mode specification information specifying the operation in the local mode, the control section 11 determines that the host connected to the host interface circuit 21b is the date and time management apparatus. On the other hand, if the date and time adjustment condition file contains mode specification information specifying the operation in the SNTP mode, the control section 11 determines that the SNTP server identified by the server name/IP address stored in the date and time adjustment condition file is the date and time management apparatus.

The control section 11 conducts communications (information exchange) with the determined date and time management apparatus, thereby keeping track of the current date and time managed by the date and time management apparatus, which will be hereinafter referred to as the real date and time (step S102). Specifically, if the date and time management apparatus is the SNTP server, the control section 11 transmits a request of the predetermined format (request of the format defined in SNTP protocol [refer to RFC-2030]) to the SNTP server and then receives a response to the request and keeps track of the real date and time at the response receiving time based on the information contained in the received response. On the other hand, if the date and time management apparatus is the local host, the control section 11 transmits a request of the predetermined format (request of the format defined in proper protocol) to the local host (date and time output program) and then receives a response to the request and keeps track of the real date and time at the response receiving time based on the information contained in the received response.

Next, the control section 11 sets the internal clock to the real date and time as the current date and time and stores the real date and time as the setup date and time (step S103).

Next, the control section 11 calculates the date and time when the time indicated by the adjustment cycle since the current date and time has elapsed and stores the calculated date and time as the adjustment execution date and time (step S104) and then waits for the apparatus date and time (date and time indicated by the internal clock) to match the adjustment execution date and time (NO at step S105). If the apparatus date and time match the adjustment execution date and time (YES at step S105), the control section 11 goes to step S106 and performs the same processing as step S102.

Next, the control section 11 calculates the time difference between the real data and time grasped at step S106 and the apparatus date and time at the point in time (real data and time-apparatus date and time), stores the time difference as the lost or gained time (in second units with a sign), and sets the grasped real date and time in the internal clock as the current date and time (step S107). At step S107, the control section 11 also stores the date and time at which the real date and time were set (namely, the grasped real date and time) as the set date and time.

Further, the control section 11 corrects each date and time information indicating the date and time after the previous date and time adjustment execution date and time (the set date and time stored at step S103 or the set date and time stored at the previous step S107) in the time and date information set in the log file, the job management file stored in the HDD 28 based on the calculated lost or gained time and the difference between the previous date and time adjustment execution date and time and the current date and time adjustment execution date and time (the difference between the two stored set dates and times, which will be hereinafter referred to as execution interval) (step S108). The execution interval used at this step and step S109 becomes information representing almost the same time as the adjustment interval if a communication error does not occur. If a communication error occurs, the execution interval becomes information representing a longer time than the adjustment interval.

Specifically, assuming that the date and time represented by the date and time information to be corrected is T, that the lost or gained time (real data and time-apparatus date and time) is $\Delta T$, and that the execution interval is D, the control section 11 corrects the date and time information to information representing date and time T' calculated according to the following expression (1):

[Expression 1]

$$T'=T0+(T-T0)\times\Delta T/D \quad (1)$$

The control section 11 also multiples the execution interval by the allowance time divided by the absolute value of the lost or gained time and stores the result value in the date and time adjustment condition file as a new adjustment interval D' (step S109) calculated according to the expression (2) below. Then, the control section 11 returns to S104.

[Expression 2]

$$D'=D\times\Delta E/\Delta T(\Delta E: \text{allowance time}) \quad (2)$$

Next, the operation of the control section 11 when a communication error occurs will be discussed.

As schematically shown in FIG. 7, the operation of the control section 11 when a communication error occurs varies depending on whether the date and time management apparatus is the SNTP server or the local host.

Specifically, if a communication error occurs in a state in which the date and time management apparatus is the SNTP server, the control section 11 displays an error message indicating occurrence of a communication error on the control panel 12. If the step at which the communication error occurs is step S102, the control section 11 will execute processing starting at step S102 in a predetermined time (in the embodiment, 20 hours). On the other hand, if the step at which the communication error occurs is step S106, the control section 11 calculates and stores the date and time in a predetermined time as the adjustment execution date and time and will execute step S105. If the processing at step S106 succeeds after the state is entered, the execution interval is calculated from the execution time of step S102 or S106 succeeded in the past (the execution time of the processing performed once before the processing which ended in failure) and the execution time of step S106 at this time. Therefore, the execution interval indicates almost the time of adding the adjustment interval and the predetermined time to each other and consequently, steps S108 and S109 are executed precisely.

If a communication error occurs in a state in which the date and time management apparatus is the local host, the control section 11 displays an error message indicating occurrence of a communication error on the control panel 12. Upon reception of a date and time adjustment request of a predetermined format from the local host, the control section 11 starts date and time adjustment processing regardless of whether the step at which the communication error occurs is step S102 or S106.

As described above, the information processing apparatus 10 according to the embodiment is an apparatus for automatically determining the interval of acquiring the current time from the external machine to adjust the date and time so that an error of the internal clock falls within the specified range.

<Modifications>

Various modifications of the information processing apparatus 10 can be made. For example, if the adjustment interval calculated at step S109 is larger than the adjustment interval in the date and time adjustment condition file, the adjustment interval in the date and time adjustment condition file can also be left intact. The information processing apparatus 10 may be set so that the adjustment interval is not rewritten (step S109 is executed only once) after the adjustment interval in the date and time adjustment condition file is once rewritten.

The information processing apparatus 10 may be modified so that the apparatus date and time are converted according to expression (1) and step S108 (date and time information correction) is not executed after step S108 is once executed. The information processing apparatus 10 is a printer, but the technology used with the information processing apparatus 10 (printer) may be used to implement an information processing apparatus for any other application than the printer, needless to say.

The invention is not limited at all to the description of the mode for carrying out the invention and the description of the embodiments. The invention includes various modifications that can be conceived easily by those skilled in the art, without departing from the description of the scope of claim.

What is claimed is:

1. A printer for printing received print job data, comprising:
   time count means for
      setting of a reference date and time,
      measuring an elapsed time since the setting of the reference date and time,
      adding the elapsed time to the reference date and time to obtain a printer current date and time, and
      outputting the printer current date and time;
   allowable time storage means for storing an allowable time set by a user;
   rewriteable nonvolatile information storage means;
   event relevant information preparation means for preparing event relevant information
      comprising the printer current date and time obtained from the time count means each time an occurrence of an event is detected, and
      storing the event relevant information in the information storage means; and
   date and time adjustment means for executing a date and time setting process comprising:
      acquiring the printer current date and time from the time count means,
      acquiring an external apparatus current date and time from an external apparatus,
      setting the external apparatus current date and time as the reference date and time in the time count means,
      determining a next date and time to execute the date and time setting process so that the difference between an expected date and time obtained from the external apparatus and an expected date and time obtained from the time count means is less than or equal to the allowable time,
      wherein the determination is based on the external apparatus current date and time, the printer current date and time, the elapsed time, and the allowable time.

2. The printer of claim 1, wherein the printer has a function of preparing printed matter comprised of several pieces of event relevant information stored in the information storage means.

3. An information processing apparatus comprising:
   time count means for
      setting a reference date and time,
      measuring an elapsed time since the setting of the reference date and time,
      adding the elapsed time to the reference date and time to obtain an information processing apparatus current date and time, and
      outputting the information processing apparatus current date and time;
   allowable time storage means for storing an allowable time set by a user; and
   date and time adjustment means for executing a date and time setting process comprising:
      acquiring the information processing apparatus current date and time from the time count means,
      acquiring an external apparatus current date and time from an external apparatus,
      setting the external apparatus current date and time as the reference date and time in the time count means,
      determining a next date and time to execute the date and time setting process so that the difference between an expected date and time obtained from the external apparatus and an expected date and time obtained from the time count means is less than or equal to the allowable time,
      wherein the determination is based on the external apparatus current date and time, the information processing apparatus current date and time, the elapsed time, and the allowable time, and
      the date and time setting process is executed at the next date and time.

4. The information processing apparatus of claim 3, wherein the determination of the next date and time to execute the date and time setting process is determined so that the difference between the expected date and time obtained from the external apparatus and the expected date and time obtained from the time count means is equal to the allowable time, and the determination is based on the external apparatus current date and time, the information processing apparatus current date and time, the elapsed time, and the allowable time.

5. The information processing apparatus of claim 3 further comprising:
   rewritable nonvolatile information storage means; and
   event relevant information preparation means for preparing event relevant information comprising the information processing apparatus current date and time obtained from the time count means each time an occurrence of a predetermined event is detected, and
   storing the event relevant information in the information storage means,
   wherein the date and time adjustment means sets a last execution date and time indicating when the date and time setting process was last executed to the external apparatus current date and time, wherein the last execution date and time is stored in the information storage means as part of the event relevant information.

6. An information processing apparatus comprising:
   time count means for
      setting a reference date and time,
      measuring an elapsed time since the setting of the reference date and time,
      adding the elapsed time to the reference date and time to obtain an information processing apparatus current date and time, and
      outputting the information processing apparatus current date and;
   allowable time storage means for storing an allowable time set by a user; and
   date and time adjustment means for executing a date and time setting process comprising:
      acquiring the information processing apparatus current date and time from the time count means,
      acquiring an external apparatus current date and time from an external apparatus,
      setting the external apparatus current date and time as the reference date and time in the time count means,
      determining a next date and time to execute the date and time setting process so that the difference between an expected date and time obtained from the external apparatus and an expected date and time obtained from the time count means is less than or equal to the allowable time, wherein the determination is based on the external apparatus current date and time, the information processing apparatus current date and time, the elapsed time, and the allowable time.

7. The information processing apparatus of claim 6, wherein the determination of the next date and time to execute the date and time setting process is determined so that the difference between the expected date and time obtained from the external apparatus and the expected date and time obtained from the time count means is equal to the allowable time, and the determination is based on the external apparatus current date and time, the information processing apparatus current date and time, the elapsed time, and the allowable time.

8. The information processing apparatus of claim 6 further comprising:

rewritable nonvolatile information storage means; and event relevant information preparation means for preparing event relevant information comprising the information processing apparatus current date and time obtained from the time count means each time an occurrence of a predetermined event is detected, and storing the event relevant information in the information storage means, wherein the date and time adjustment means sets a last execution date and time indicating when the date and time setting process was last executed to the external apparatus current date and time and the last execution date and time is stored in the information storage means as part of the event relevant information.

* * * * *